March 8, 1966     C. V. SPENCER     3,239,237
RETRACTIBLE LOGGING TRAILER UNLOADING STRAP
Filed Sept. 19, 1963      2 Sheets-Sheet 1

Clark V. Spencer
INVENTOR.

March 8, 1966  C. V. SPENCER  3,239,237
RETRACTIBLE LOGGING TRAILER UNLOADING STRAP
Filed Sept. 19, 1963  2 Sheets-Sheet 2
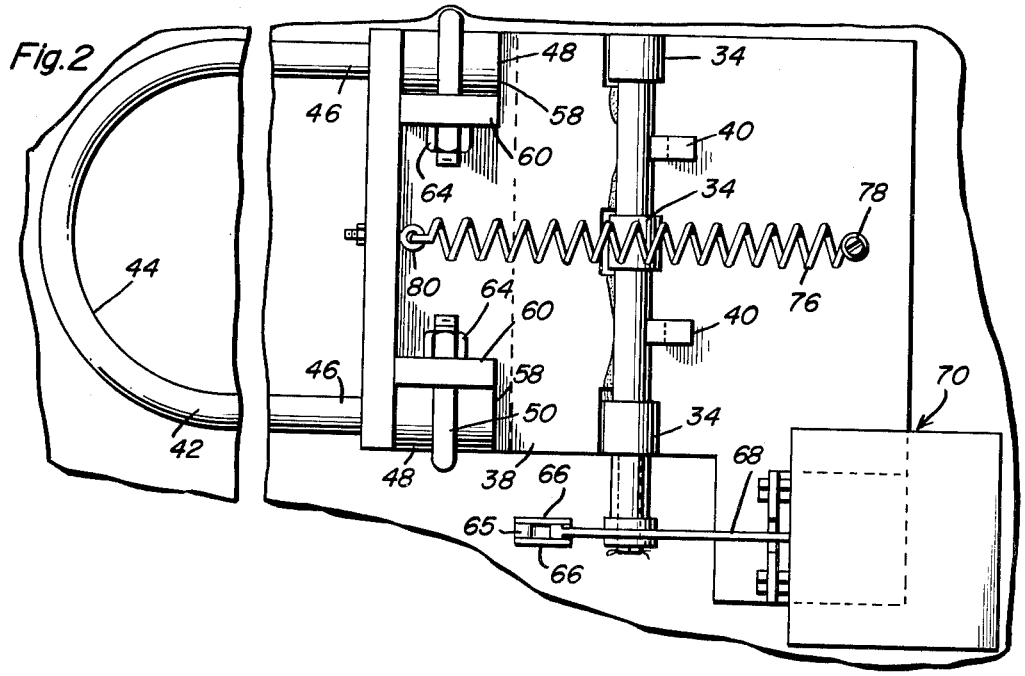
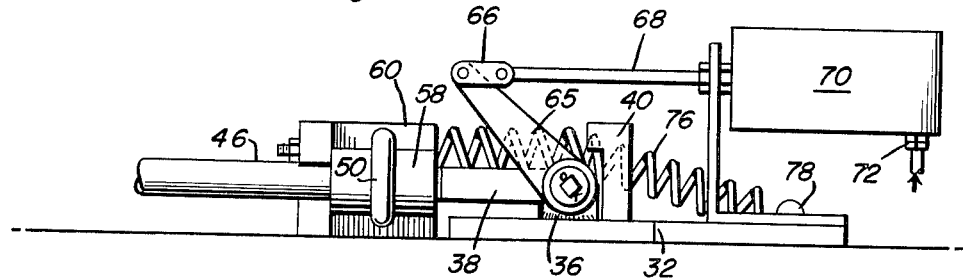
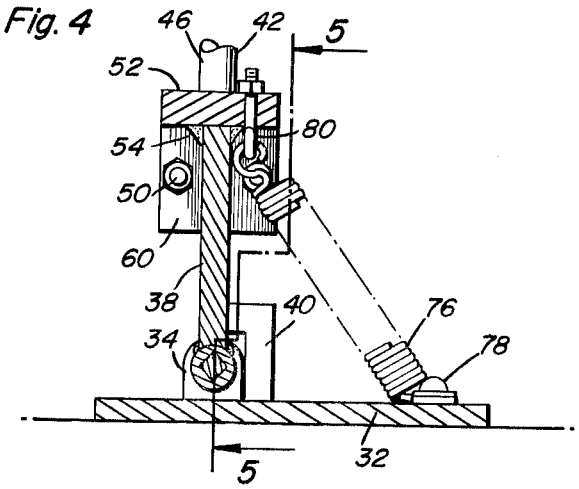
Clark V. Spencer
INVENTOR.

United States Patent Office 3,239,237
Patented Mar. 8, 1966

3,239,237
RETRACTIBLE LOGGING TRAILER
UNLOADING STRAP
Clark V. Spencer, Grants Pass, Oreg., assignor, by direct
and mesne assignments, to Pierce Trailer & Equipment
Co., Portland, Oreg., a corporation of Oregon
Filed Sept. 19, 1963, Ser. No. 310,086
8 Claims. (Cl. 280—150)

This invention relates to a novel and useful retractible logging trailer unloading strap and more specifically to a retractible lift member to be secured to a logging trailer and utilized as a point of connection between a lifting assembly such as a crane and the logging trailer for lifting the latter when it is desired to position the logging trailer on the rear portion of its tractor in "piggy-back" fashion.

Large semi-trailer vehicles of the type including a tractor and a semi-trailer are utilized in hauling heavy logs to a lumber or pulp mill after the logs have been cut from the forest. These semi-trailer vehicles are difficult to handle on mountainous roads but a loaded tractor-trailer vehicle can be driven from on top of a mountain where the logs are cut down to a lumber mill at a lower elevation without too much difficulty. The main difficulty arises when these tractor-trailer vehicles attempt to move back up the mountain when they are unloaded over relatively rough logging roads. A semi-trailer vehicle usually has driving wheels on the rear end of the tractor portion thereof only and inasmuch as the truck is not loaded the driving wheels of the tractor quite often effect less than the requisite amount of traction for the truck to climb to the top of the mountain. Accordingly, present practice dictates, in areas where unloaded trucks will have to climb to relatively high elevations before being loaded, that the tractor section of the vehicle be modified so as to be capable of accommodating the trailer section of the vehicle thereon in piggy-back fashion whereby considerably more weight is placed on the rear driving wheels of the tractor without appreciably adding to the weight of tractor-trailer combination itself. By means of this practice, unloaded tractor-trailer vehicles are provided with sufficient traction to enable them to climb back up the logging roads they utilize to haul the logs down to the mill from higher elevations.

While the practice of carrying the trailer section of the vehicle in piggy-back fashion on the tractor section thereof is not itself novel, the industry has been utilizing trailers to which generally U-shaped unloading straps made of cable are removably attached by means of a pin and clevis. The use of a removable unloading strap or hook dictates that someone must climb up onto the trailer each time the unloading strap is to be removed from or secured to the trailer. The person having this job is subject to having his hands or fingers and possibly other parts of his body smashed or otherwise injured by the apparatus which is secured to the loading strap for loading and unloading the trailer. In addition, in the winter months it is conceivable that a workman could have serious injury inflicted upon him should he slip on snow and/or ice on the tractor or trailer while mounting the same to either remove or secure the loading strap to the trailer.

The unloading strap of the instant invention includes an inverted U-shaped bail-type strap which is pivotally secured to the trailer at the lower ends of its depending legs for movement about an axis extending between the legs. The bail-type strap is movable between an upstanding position and a lowered generally horizontally disposed inoperative position and means is provided for yieldingly urging the strap to its upright position. However, a fluid motor is operatively connected to the bail and is utilized to move the bail to the horizontally disposed inoperative position. The fluid motor is of a single action piston-type and has its inlet communicated with the "hot line" of the air brake system of the trailer. Thus, whenever the hot line between the tractor and the trailer is broken, the fluid motor will be inoperative to maintain the bail-type strap in the horizontally disposed inoperative position and the bail will be automatically yieldingly urged toward the upright operative position. Further, each time the trailer is coupled to the tractor after having been carried piggy-back, as soon as the hot line of the trailer is connected to the hot line of the tractor the fluid motor will again be actuated and the bail will be automatically moved to the inoperative position.

The main object of this invention is to provide an unloading strap for logging trailers which may be moved between an upstanding operative position and a horizontally disposed inoperative position in a manner which is completely automatic thereby eliminating the necessity for a workman to mount the trailer for the purpose of removably securing an unloading strap thereto or removing the unloading strap therefrom.

A further object of this invention, in accordance with the immediately preceding object, is to provide an unloading strap of the bail-type which has sufficient rigidity to maintain its shape thereby enabling the operator of the crane to engage the bail-type lifting strap with a hook of a crane without requiring that a workman be positioned on the trailer section of the vehicle for the purpose of guiding the hook into proper engagement with the lifting strap.

A final object of this invention to be specifically enumerated herein is to provide a retractible logging trailer unloading strap in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like uarts throughout, and in which:

FIGURE 1 is a side elevational view of a conventional form of tractor trailer vehicle used in the logging industry and showing the manner in which the trailer section of the vehicle may be carried upon the tractor section thereof in piggy-back fashion and the manner in which the unloading strap of the instant invention is positioned on the trailer in an operative position whenever the trailer is disconnected from the tractor;

FIGURE 2 is a fragmentary enlarged top plan view of the unloading strap with the strap being shown in the retracted inoperative position;

FIGURE 3 is a side elevational view of the embodiment illustrated in FIGURE 2 on somewhat of a reduced scale;

FIGURE 4 is a fragmentary longitudinal vertical sectional view taken substantially upon a plane passing through the center of the unloading strap and with the bail thereof shown in the operative position.

Figure 1:
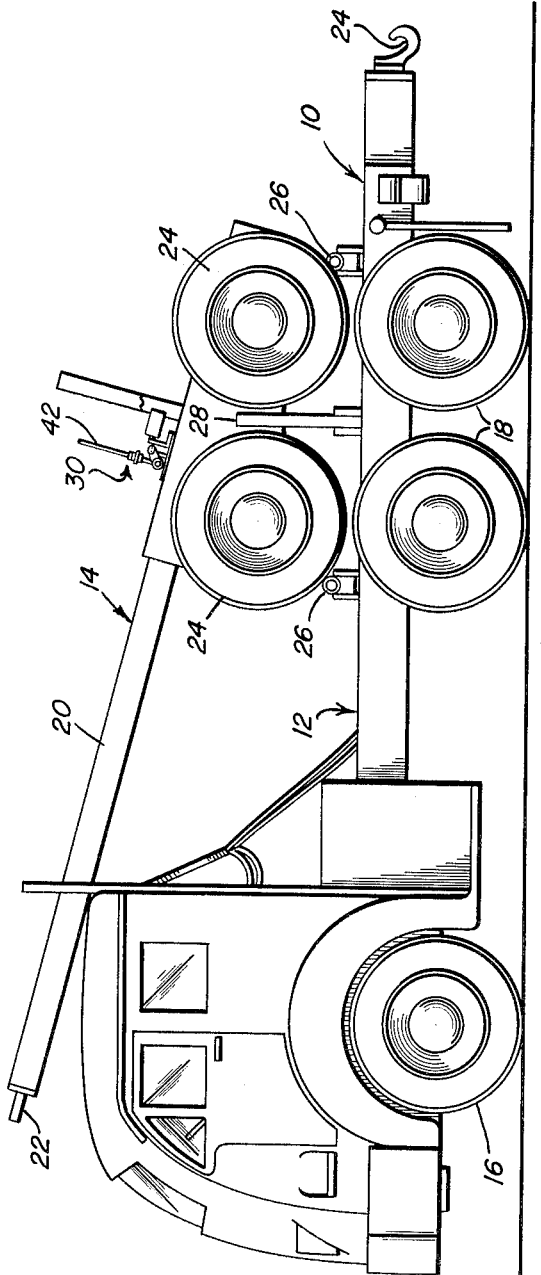
Figure 5:
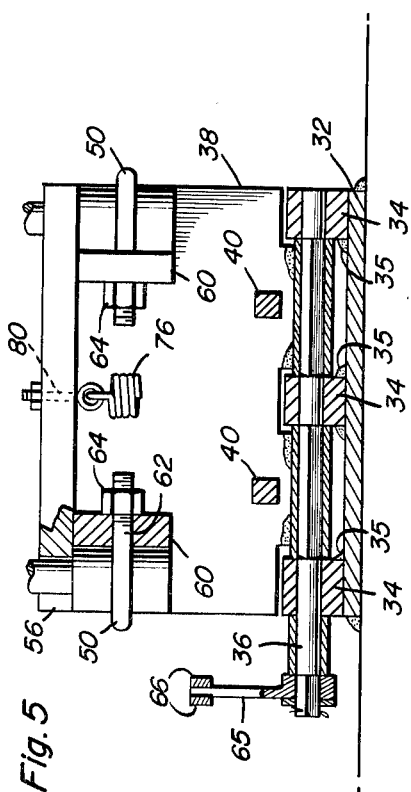
FIGURE 5 is a fragmentary sectional view taken substantially upon a plane indicated by section line 5—5 of FIGURE 4.

Referring now more specifically to the drawings, the numeral 10 generally designates a conventional form of tractor-trailer vehicle combination which includes a tractor section generally referred to by the reference numeral 12 and a trailer section generally referred to by the reference numeral 14. The tractor section 12 includes front wheels 16 and rear driving wheels 18 and the trailer 14 includes an elongated tongue or boom 20 whose forward end is provided with an eye 22 that may be engaged with a hook 24 on the rear end of the tractor section 12 when it is desired to trail the trailer section 14 behind the tractor section 12.

The trailer section 14, however, may be carried in piggy-back fashion on the rear end of the tractor section 12 as shown in FIGURE 1 of the drawings with the tandem wheel assemblies 24 cradled between transverse blocking means 26 carried by the tractor section 12. In addition, upright saddle arms 28 are carried on the tractor section 12 and embrace the rear portion of the trailer section 14 therebetween to prevent transverse shifting of the trailer section 14 to the tractor section 12.

The retractible logging trailer unloading strap of the instant invention is generally referred to by the reference numeral 30 and includes a mounting plate 32 which may be secured to the deck of the trailer section 14 in any convenient manner such as by welding. It is to be noted that mounting plate 32 is secured to the deck of the trailer section 14 adjacent the center of gravity thereof and at least slightly above the latter whereby the trailer section 14 may be readily supported from the mounting plate 32 in a horizontally disposed position.

The mounting plate has a pair of upstanding journals 34 secured thereto in any convenient manner such as by welding 35 and the journals 34 rotatably support a pivot shaft 36 to which a plate-like arm 38 is secured. The arm 38 extends generally radially of the pivot shaft 36 and may be swung between the horizontally disposed position illustrated in FIGURE 3 of the drawings and the upright position illustrated in FIGURE 4 of the drawings. The mounting plate 32 has a pair of upright abutments 40 secured thereto which are engageable by the plate-like arm 38 to limit movement of the arm 38 to the upright position.

A lifting member which is generally U-shaped and is preferably constructed of wire rope is referred to by the reference numeral 42 and includes a curved bight portion 44 and a pair of generally parallel legs 46. The bight portion 44 interconnects one pair of corresponding ends of the legs 46 and the other pair of ends of the legs 46 are secured in ferrules 48 which are secured to the plate-like arm 38 by means of U-shaped clamps 50. The free end of the arm 38 includes a transversely extending flange 52 which projects from opposite sides of the arm 38 and is secured thereto in any convenient manner such as by welding 54. The flange 52 is provided with notches 56 on its opposite ends through which the ends of the legs 46 adjacent the ferrules 48 are received. Further, the arm 38 is notched as at 58 to snugly embrace the ferrules 48 and the clamps 50 are secured to a pair of mounting flanges 60 which are secured to the arm 38 and the flange 52 in any convenient manner such as by welding. The free ends of the U-clamps are passed and secured through apertures 62 provided therefor in the mounting flanges 60 and by means of nuts 64.

One end of the pivot shaft 36 extends outwardly to one side of the mounting plate 32 and has a crank arm 65 secured thereto. The free end of the crank arm 65 is pivotally secured to a link 66 whose other end is pivotally secured to the extended end of a piston rod 68 of the single acting fluid motor generally referred to by the reference numeral 70. The single acting fluid motor 70 is of conventional design and includes a piston slidable within a bore to which the end of the rod 68 remote from the link 66 is secured. The piston end of the fluid motor is provided with a fluid inlet 72 which is adapted to be communicated with the "hot line" of the trailer section 14. It is of course to be noted that the fluid motor 70 is operative to swing the crank arm 65 and therefore the arm 38 in a counterclockwise direction as viewed in FIGURE 3 of the drawings to move the lift member 42 to the lowered inoperative position. However, when the communication between the "hot line" on the trailer section 14 and the "hot line" on the tractor section 12 is terminated, the expansion spring 76 which has one end secured to the mounting plate 32 as at 78 and the other end secured to the flange 52 by means of a fastener 80 will pull the arm 38 to the upright position illustrated in FIGURE 4 of the drawings whereby the bail-type lift member 42 will be disposed in the operative position for engagement by the lifting hook of a crane. Accordingly, as soon as the trailer section 14 is completely uncoupled from the tractor section 12 subsequent to lifting the trailer section 14 on top of the tractor section 12, the expansion spring 76 will be operative to swing the lift member 42 to the raised operative position inasmuch as the fluid motor 70 will be deactivated since it will no longer be in communication with the "hot line" of the tractor section 12. Thereafter, when the trailer section 14 is lifted from the tractor section 12 and operatively coupled to the latter in readiness to receive logs which are to be carried to the lumber or pulp mills, the fluid motor 70 will be actuated as soon as the "hot line" of the air brakes of the trailer section 14 is communicated with the corresponding "hot line" of the tractor section 12 and therefore the bail-type lift member 42 will automatically be moved to the inoperative position illustrated in FIGURES 2 and 3 of the drawings.

While the bail-type strap moving mechanism has been generically described as a fluid motor, in one specific adaptation, air cans such as those conventionally employed in a trailer air brake system have been successfully employed thereby enabling conventional and readily available components to be employed when constructing the invention. A suitable air compressor provides a supply of air under a predetermined working pressure such as between 90 to 120 p.s.i. Also, each air can has an expansion spring to return the piston rod to its retracted position when air pressure is exhausted from the air can with the spring 76 acting as a pull spring to urge the bail strap toward an upright position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A retractible logging trailer unloading strap assembly comprising a mount adapted to be secured to a logging trailer adjacent and above its center of gravity, a bail-type loading strap including a pair of depending legs interconnected at their upper ends by means of a bight portion, means pivotally securing said strap to said mount for rotation about an axis extending between the lower ends of said legs for movement between a raised operative substantially vertically disposed position and a lowered inoperative substantially horizontally disposed position, means yieldingly urging said strap toward said raised operative position, and fluid motor means connected to said strap and operative to move said strap to the lowered inoperative position whenever said fliud motor is communicated with a suitable source of fluid under pressure, said fluid motor including fluid inlet means adapted to be communicated with the "hot line" of the fluid brake system of a tractor to which said trailer is connected.

2. In combination with a logging trailer adapted to be carried in "piggy-back" fashion on a logging tractor when unloaded and to be trailed behind said tractor when loaded, said trailer having fluid pressure actuated brakes including a "hot line" adapted to be communicated with the fluid actuated brake system of said tractor and to be actuated thereby, a retractible logging trailer unloading strap assembly comprising an upright bail-type loading strap, means securing the lower end of said strap to said trailer for rotation about a generally horizontally disposed axis generally paralleling the medial plane of said loading strap and disposed adjacent and above the center of gravity of said trailer for movement between a raised operative substantially vertically disposed position and a lowered inoperative substantially horizontally disposed position, force means yieldingly urging said strap toward said raised operative position, and fluid motor means connected between said trailer and said strap including fluid pressure inlet means communicated with said "hot line" and operable to move said strap to the lowered inoperative position against the force applied to said strap by said force means until such time as communication of said inlet with said "hot line" is terminated.

3. A retractible logging trailer unloading assembly comprising a mount adapted to be secured to a logging trailer, said assembly comprising a mount, an elongated upright lift member whose upper end is adapted to be engaged by a second lift member on a crane or the like, means pivotally securing the lower end of said upright lift member to said mount for rotation about a generally horizontally disposed axis and movement of said upright lift member between a raised upright operative position and a lowered generally horizontally disposed inoperative position, means yieldingly urging said upright lift member to said raised position, and fluid motor means connected to said upright lift member and operative to move said strap to the lowered inoperative position whenever said fluid motor is communicated with a suitable source of fluid under pressure, said fluid motor including inlet means adapted to be communicated with the "hot line" of the fluid actuated brake system of a logging trailer.

4. The combination of claim 1 wherein said fluid motor comprises a single action extendable fluid motor of the reciprocating piston type.

5. The combination of claim 4 wherein said means yieldingly urging said strap toward said raised operative position comprises spring means.

6. The combination of claim 1 wherein said bight portion of said strap comprises a flexible member such as wire rope.

7. The combination of claim 6 wherein at least the lower ends of said legs are rigid and are rigidly interconnected.

8. In combination with a logging trailer adapted to be carried in "piggy-back" fashion on a logging tractor when unloaded and to be trailed behind said tractor when loaded, a retractible logging trailer unloading strap assembly comprising an elongated mounting member, means pivotally securing one end of said mounting member to said trailer for rotation about a generally horizontally disposed axis extending transversely of said mounting member, a generally U-shaped lifting member including a pair of leg portions interconnected at one pair of corresponding ends by means of a bight portion, means securing the other pair of corresponding ends of said leg portions to the other end of said mounting member in spaced apart relation and with said legs disposed in a plane generally paralleling said elongated mounting member and said U-shaped lifting member opening toward said one end of said mounting member, each of said other ends of said leg portions including a ferrule, said means securing said other pair of corresponding ends of said leg portions to the other end of said mounting member including means carried by said mounting member and releasably fixedly securing said ferrules to said mounting member.

References Cited by the Examiner

UNITED STATES PATENTS

| Re. 5,280 | 2/1873 | Shepard | 16—126 |
| 1,090,122 | 3/1914 | Adams. | |
| 2,144,042 | 1/1939 | Armington | 214—38.42 X |
| 2,465,944 | 3/1949 | Taylor | 294—67 X |
| 2,593,954 | 4/1952 | Abreu | 214—10.5 X |

FOREIGN PATENTS 116,332    12/1942    Australia.

BENJAMIN HERSH, *Primary Examiner.*

LEO FRIAGLIA, *Examiner.*

W. A. MARCONTELL, *Assistant Examiner.*